United States Patent [19]

Erlandsson

[11] Patent Number: 4,861,217
[45] Date of Patent: Aug. 29, 1989

[54] VEHICLE RESTRAINT USING BOTH LINEAR AND PIVOTAL MOVEMENT

[75] Inventor: Kjell I. Erlandsson, Milwaukee, Wis.

[73] Assignee: Kelley Company, Inc., Milwaukee, Wis.

[21] Appl. No.: 15,851

[22] Filed: Feb. 17, 1987

[51] Int. Cl.$^4$ ............................................. B65G 67/02
[52] U.S. Cl. .................................. 414/401; 414/917; 414/719; 414/673; 901/48; 14/71.1
[58] Field of Search ............... 414/401, 402, 584, 396, 414/719, 917, 673, 11; 14/71.1, 71.3; 901/48; 187/17, 18

[56] References Cited

U.S. PATENT DOCUMENTS

| | | |
|---|---|---|
| 2,693,284 | 11/1954 | Gerhardt . |
| 2,943,707 | 7/1960 | Ramlose ......................... 414/401 X |
| 3,503,528 | 3/1970 | Martelee ............................ 414/754 |
| 4,016,989 | 4/1977 | Furnari ........................... 414/401 X |
| 4,127,856 | 11/1978 | Bickel .................................. 340/687 |
| 4,148,498 | 4/1979 | Taylor, Jr. ........................... 280/482 |
| 4,208,161 | 6/1980 | Hipp et al. ............................ 414/401 |
| 4,218,171 | 8/1980 | Guinot .............................. 414/917 X |
| 4,264,259 | 4/1981 | Hipp .................................... 414/401 |
| 4,267,748 | 5/1981 | Grunewald et al. .................. 74/529 |
| 4,282,621 | 8/1981 | Anthony et al. ..................... 14/71.1 |
| 4,373,847 | 4/1983 | Hipp et al. ........................... 414/401 |
| 4,427,334 | 1/1984 | Copie et al. ..................... 414/917 X |
| 4,443,150 | 4/1984 | Hahn et al. .......................... 414/401 |
| 4,472,099 | 9/1984 | Hahn et al. .......................... 414/401 |
| 4,488,315 | 12/1984 | Bennett et al. ....................... 14/71.3 |
| 4,555,211 | 11/1985 | Netz .................................... 414/401 |
| 4,560,315 | 12/1985 | Hahn ................................... 414/401 |
| 4,589,813 | 5/1986 | Hagen et al. ........................ 414/401 |
| 4,634,334 | 1/1987 | Hahn et al. .......................... 414/401 |
| 4,674,941 | 6/1987 | Hageman ............................ 414/401 |
| 4,695,216 | 9/1987 | Erlandsson ......................... 414/401 |

Primary Examiner—Frank E. Werner
Attorney, Agent, or Firm—Andrus, Sceales, Starke & Sawall

[57] ABSTRACT

An improved vehicle restraint for preventing movement of a vehicle such as a truck away from a loading dock during a loading operation. The vehicle restraint includes a guide frame mounted on the front face of a loading dock and a vehicle restraining device is movable on said guide frame from a lower storage position to an upper operative position where it engages the ICC bar on a truck. A biasing mechanism serves to bias the restraining device upwardly to the operative position while a power operated drive mechanism acts to drive the restraining means downwardly to the storage position. The restraining device includes a slide or carriage that moves on the guide frame and a hook that is pivoted to the slide. A linkage connects the frame and the hook in a manner such that the force of the biasing device will not only move the slide upwardly on the guide frame but will also pivot the hook upwardly relative to the slide.

20 Claims, 3 Drawing Sheets

VEHICLE RESTRAINT USING BOTH LINEAR AND PIVOTAL MOVEMENT

BACKGROUND OF THE INVENTION

Vehicle restraints are employed to prevent accidental movement of a truck away from a loading dock during a loading operation. When a truck is parked in front of a loading dock the rear end of the truck completely encloses the doorway in the loading dock with the result that the truck driver cannot observe the loading or unloading of cargo from the truck by a lift truck or other mechanical handling equipment. To prevent the truck from accidentally pulling away from the dock before the loading or unloading operation is completed, vehicle restraints have been used which are mounted on the loading dock and engage the ICC bar mounted at the rear end of the truck. The ICC bar is a bar beam that extends horizontally across the rear of the truck beneath the truck bed and is intended to prevent an automobile from underriding the truck in the event of a rear end collision.

Certain types of vehicle restraints, such as that disclosed in U.S. Pat. No. 4,488,325, employ a linear moving hook which is moved vertically along the front face of the dock from a lower storage position to an upper operative position where it engages the ICC bar. Other types of vehicle restraints employ a pivotable hook and are swung upwardly into engagement with the ICC bar.

Vehicle restraints are commonly used in conjunction with a dockboard. The conventional dock board is mounted in a pit or depression in the upper surface of the dock and includes a ramp which is hinged at its rear edge to the dock, while a lip is hinged to the front end of the ramp and is movable between a downwardly hanging pendant position and an extended position where it forms an extension to the ramp and serves to bridge the gap between the loading dock and the truck bed. When used with a dockboard, the vehicle restraint is mounted on the front face of the dock beneath the pit in which the dockboard is housed. With a vehicle restraint that utilizes a linear moving hook, an elongated guide mechanism is mounted on the dock face beneath the pit and the hook moves vertically in the guide mechanism from the lower storage position to the upper operative position.

The vertical height of an ICC bar above the ground may vary considerably depending upon the make and the type of truck involved. In order to affectively accommodate ICC bars of different heights, the guide mechanism, on which the hook is mounted for vertical movement, must have a substantial height, yet the guide mechanism should not extend above the bottom of the pit or it will interfere with the swinging action of the lip of the dockboard. Because of this, in certain installations that have a deep dockboard pit, the front face of the dock beneath the pit does not have sufficient vertical height to mount a conventional vehicle restraint.

SUMMARY OF THE INVENTION

The invention is directed to an improved vehicle restraint incorporating an upwardly biased restraining means or hook assembly having an increased vertical operating range.

In accordance with the invention, the vehicle restraint includes a guide frame mounted on the front face of the dock, and a restraining means includes a slide or carriage, which is mounted to move vertically on the guide frame, and a hook that is pivotally connected to the slide.

Interconnecting the hook and the frame is a linkage that is constructed so that the hook can be moved from a lower storage position, where the hook is generally parallel to the driveway in front of the dock, to an upper operative position where the hook is not only elevated vertically but is also pivoted upwardly from the horizontal.

A biasing mechanism biases the hook to the upper operative position, while power operated drive means, such as a linear actuator, is operably connected to the linkage and serves to move the hook from the upper operative position to the lower storage position.

In operation, the hook is held in the lower storage position by the self-locking linear actuator acting through the connecting linkage, which overcomes the force of the biasing mechanism. After a truck backs to the loading dock, the operator releases the linear actuator enabling the biasing mechanism to pivot the linkage to move the slide upwardly in the guide frame and simultaneously pivot the hook upwardly to bring the hook into engagement with the ICC bar of the truck. With the hook engaged with the ICC bar, the truck will be prevented from accidentally moving away from the loading dock during the loading operation.

After the loading operation is completed, the hook is moved to its storage position by operation of the linear actuator which overcomes the force of the biasing mechanism to return the hook to the storage position.

As the hook not only moves vertically in a linear path, but also pivots upwardly in a vertical plane, the hook is capable of engaging an ICC bar which is located a substantial distance above the upper end of the guide frame. This enables the range of the hook to be increased relative to the height of the guide frame so that the guide frame need not extend upwardly above the bottom of the pit to a location where it may interfere with the swinging action of the lip of the dockboard.

The biasing mechanism, which can take the form of a gas spring enables the hook, when in its operative position, to move up and down with vertical float of the truck bed.

As a further feature, the linear actuator is connected to the linkage in a manner such that the linear actuator can be moved to its fully extended position even if the hook is prevented, by the position or elevation of the ICC bar, from moving to its uppermost operative position and this permits full float of the hook within its extreme upper and extreme lower positions.

Other objects and advantages will appear in the course of the following description.

DESCRIPTION OF THE DRAWINGS

The drawings illustrate the best mode presently contemplated of carrying out the invention.

In the drawings:

FIG. 7 is a view similar to FIG. 6 with the vehicle restraint in the operative position.

DESCRIPTION OF THE ILLUSTRATED EMBODIMENT

Figure 1:
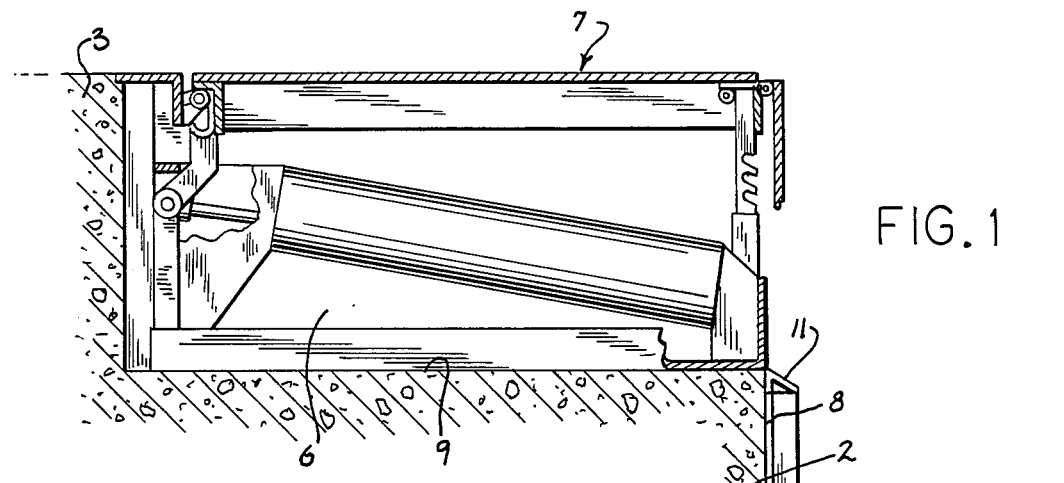
FIG. 1 is a vertical section of a loading dock incorporating the vehicle restraint of the invention.

The drawings illustrate a vehicle restraint 1 to be mounted on the front face 2 of a loading dock 3. Vehicle restraint 1 includes a restraining member or hook assembly 4 which is adapted to be moved from a lower storage position to an upper operative position where it engages the ICC bar 5 mounted on a truck at a level beneath the truck bed. The ICC bar is a bar or beam which is mounted to prevent an automobile from underriding the truck in the event of a rear end collision.

As shown in FIG. 1, dock 3 can be formed with a depression or pit 6 and an adjustable dockboard or dockleveler 7 can be mounted in the pit and acts to span the gap between the dock and the bed of the truck parked in front of the dock.

Vehicle restraint 1 includes a mounting plate 8 which is mounted through suitable anchor bolts to front face 2 of dock 3 and the top of the mounting plate 8 is located beneath the bottom 9 of pit 7.

Welded in spaced relation to mounting plate 8 is a pair of guide angles 10 and a cross member 11 is secured across the upper ends of guide angles 10.

Figure 4:
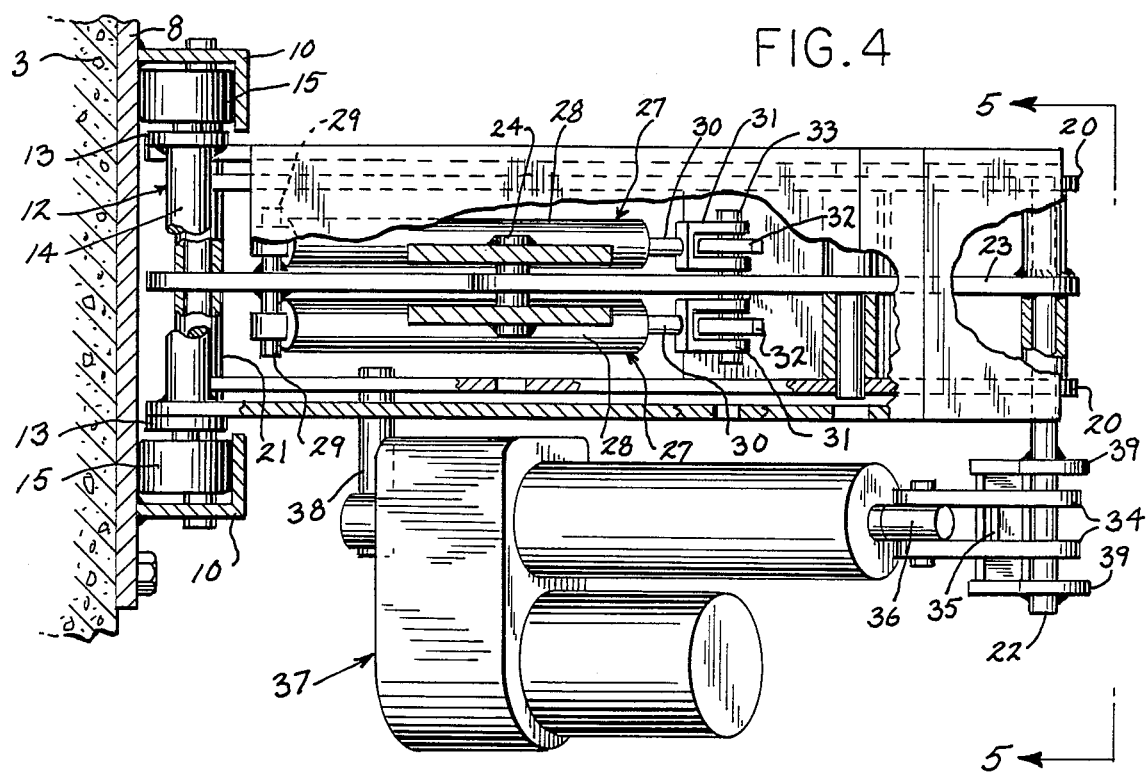
FIG. 4 is a top plan view of the vehicle restraint with parts broken away in section.
Figure 5:
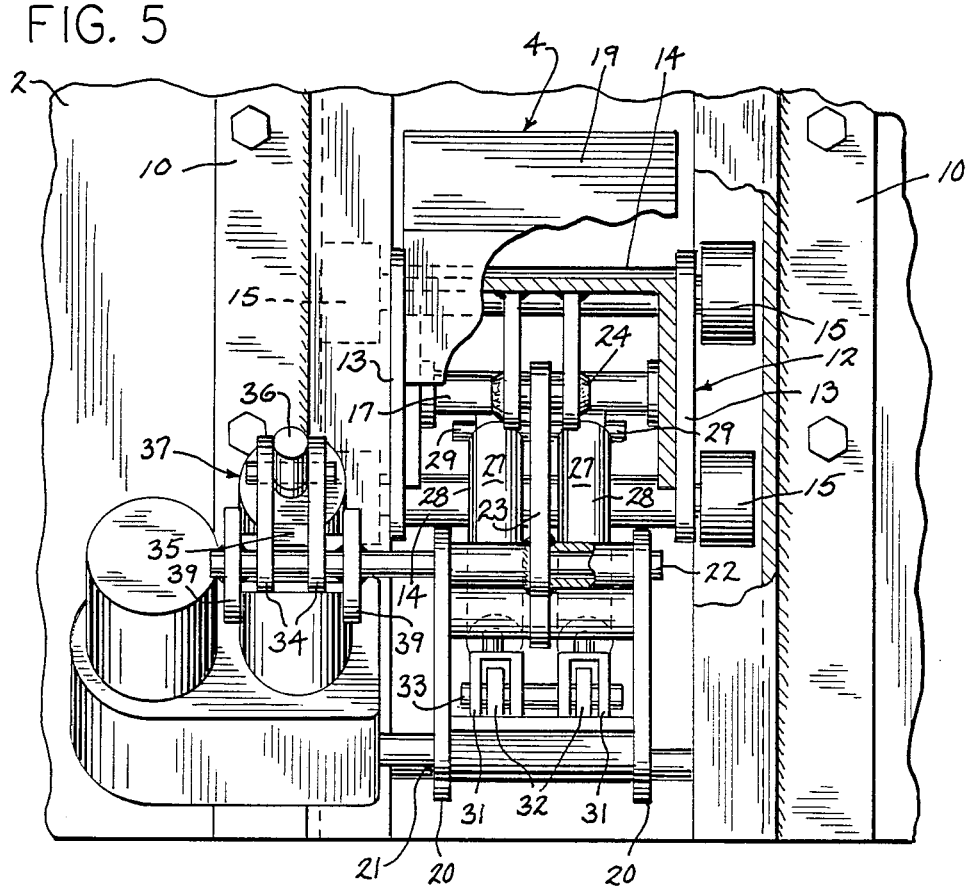
FIG. 5 is an end view taken along line 5—5 of FIG. 4 with parts broken away in section.

Hook assembly 4 includes a carriage or slide 12 that is mounted to move in guides 10 and is composed of a pair of side plates 13 connected by a pair of parallel shafts 14. Rollers 15 are journalled on the projecting ends of shafts 14 and are adapted to ride in the angle guides 10, as best illustrated in FIG. 4.

Hook assembly 4 also includes a generally L-shaped hook or restraining member 16 which is pivotably connected to the carriage 12 on a shaft 17 which extends between side plates 13 of the carriage.

Figure 2:
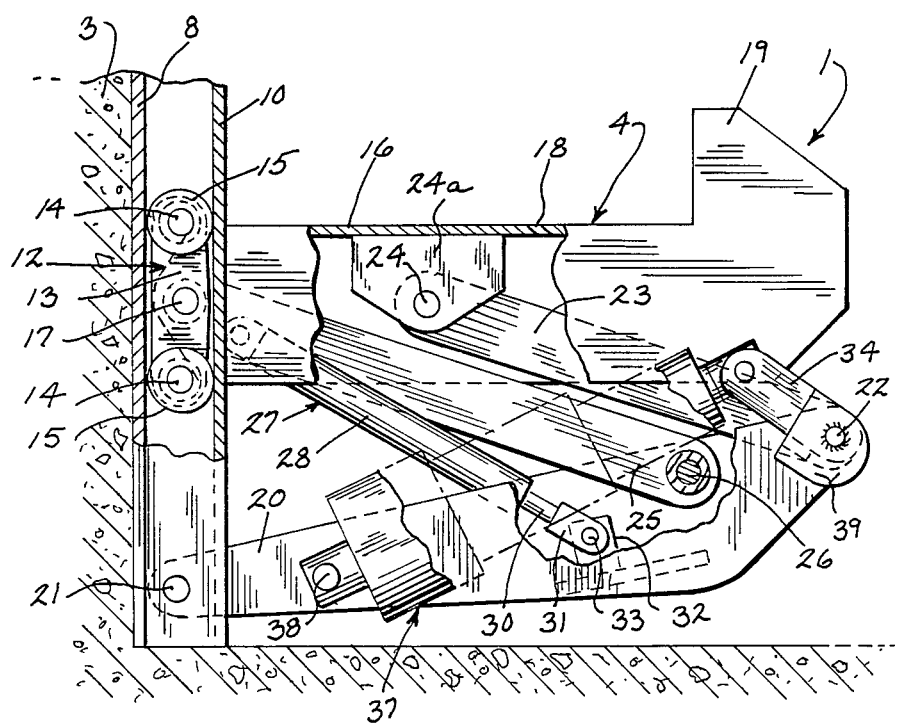
FIG. 2 is an enlarged side elevation with parts broken away in section of the vehicle restraint in the lower or storage position.
Figure 3:
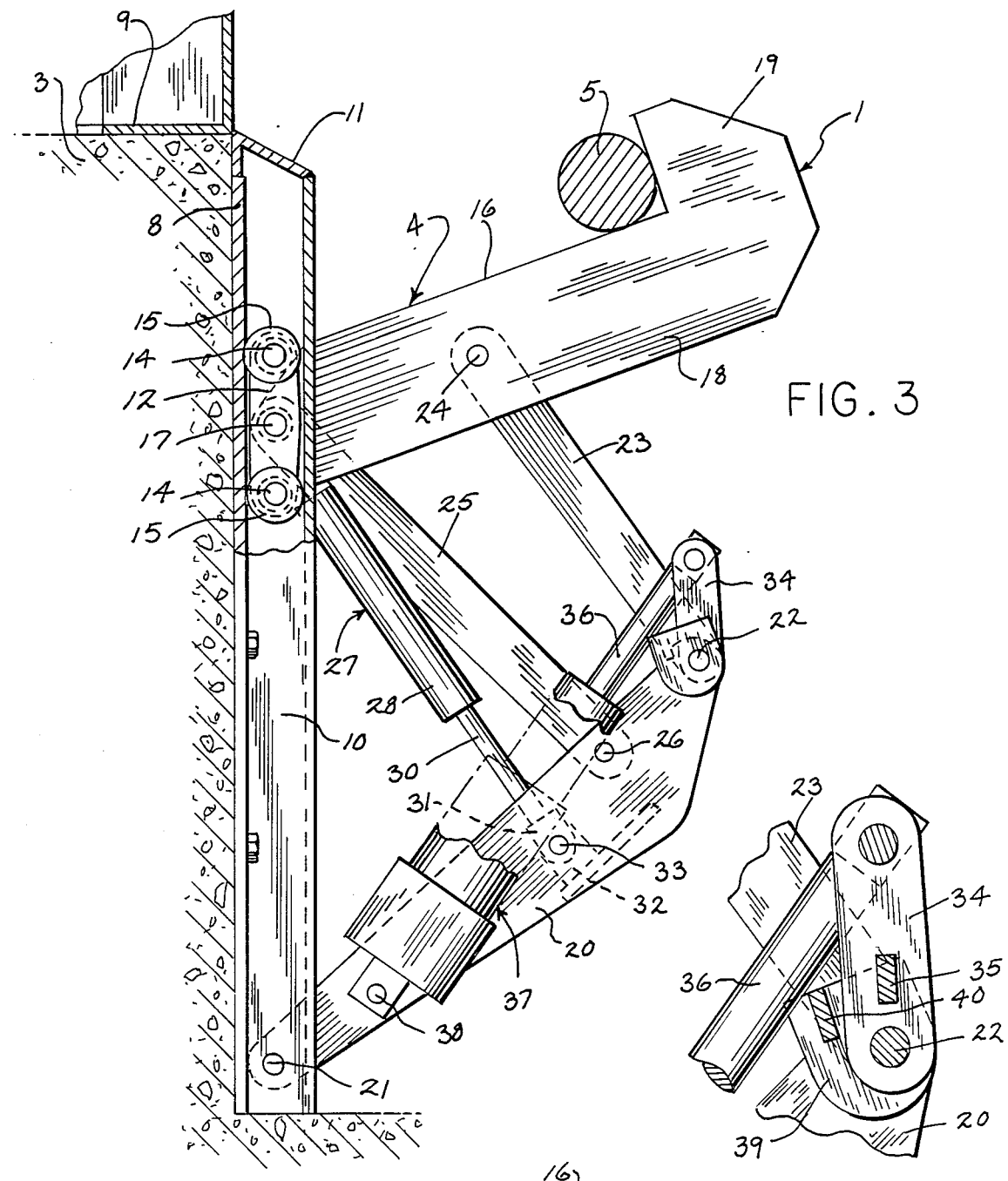
FIG. 3 is a view similar to FIG. 2 and showing the vehicle restraint in the operative position.

As shown in FIGS. 2 and 3, hook 16 includes a generally straight inner section 18 which extends outwardly from the pivot shaft 16 and an outer tip 19 which extends upwardly from the outer end of inner section 18. When in the operative position, tip 19 forms an obstruction to prevent the ICC bar 5 from moving outwardly away from dock 3.

Figure 8:
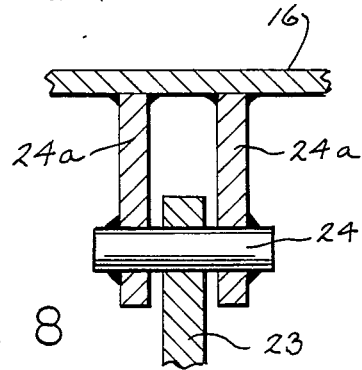
FIG. 8 is an enlarged fragmentary transverse section showing the attachment of a link to the hook.

In accordance with the invention, a linkage interconnects hook assembly 4 and the fixed frame or supporting structure. The linkage includes a pair of parallel links 20 having corresponding ends secured to the lower ends of guide angles 10 by pivot shafts 21. The opposite or outer ends of links 20 are pivotably connected to a shaft 22, and the lower end of a link 23 is secured or fixed to shaft 22 and is located centrally between links 20. The upper end of link 23 is pivotably connected through a pivot shaft 24 to parallel internal walls 24a of hook 16, as shown in FIGS. 2 and 8.

In addition, a link 25 interconnects the hook 16 and links 20. The lower end of link 25 is pivotably connected to links 20 by pivot shaft 26, while the upper end of link 25 is pivotably mounted on shaft 17.

Hook 16 is biased to the operative position by a pair of gas spring units 27. Each gas spring unit 27 includes a cylinder 28 which is pivotably connected to an arm 29 which extends laterally from the upper end of link 25. Piston rod 30, which extends outwardly from each cylinder 28, carries a clevis 31 that is pivoted to a lug 32 on shaft 33 that extends between links 20.

Gas spring units 27 are a conventional type in which the cylinder 28 contains a compressed gas, such as air or nitrogen. The force of the compressed gas urges the piston rod 30 to an extended position, and the conventional gas spring includes one or more openings in the piston to permit flow of gas between opposite ends of the cylinder as the piston rod is extended and retracted. While the pressure on both sides of the piston is the same, the larger surface area on the side of the piston which does not include the piston rod will result in a force to extend the piston rod. In the construction as illustrated, the force of gas spring units 27 will act to expand the angle between links 20 and 23 to thereby move the hook 16 to the upper or operative position where it engages the ICC bar 5.

Hook 4 is driven downwardly to the lower or storage position and in this regard a pair of parallel links 34 are journalled on the projecting end of shaft 22 and links 34 are connected by a bar 35. Links 34 are pivotably connected to the outer end of shaft 36 of linear actuator 37. Linear actuator 37 is a conventional unit designed to provide a linear force and includes a motor which operates through a gear train to rotate a recirculating ball screw to move the shaft 36 in a reciprocating path. The linear actuator can be a type as sold by Warner Electric Company under the model designation ACA-04PC.

The lower end of linear actuator 37 is pivotably connected to one of the links 20 through pin 38.

A pair of lugs 39 are secured or fixed to the projecting end of shaft 22 and are located outwardly of links 34. Lugs 39 are connected together by a bar 40.

The construction provides a lost motion action which is important when utilizing a linear actuator. The linear actuator, by nature, is either completely extended or retracted, except when moving between the retracted and extended positions, and cannot be back driven. Thus, if hook 16 engages ICC bar 5 before the hook reaches its uppermost position, shaft 36 of the linear actuator 37 will continue to move to its fully extended position, pivoting link 34 out of engagement with stop 40 on link 39, as shown in FIG. 3. This enables shaft 36 to be fully extended even though hook 4 is not at its uppermost position.

Further, if hook 16 is engaged with the ICC bar 5, as shown in FIG. 3, and the hook is then depressed by downward movement or float of the ICC bar and truck bed, arm 23 and connected link 39 can pivot relative to link 34 and actuator shaft 36 to move stop 40 on link 34 further from the side edge of link 34. This permits hook 16 to float downwardly while maintaining the actuator shaft 36 in its fully extended position.

On the other hand, if a fluid cylinder, such as an air or hydraulic cylinder, was used in place of the linear actuator, the lost motion connection would not be required as the fluid cylinder arrangement could be resilient to accommodate float.

Figure 6:
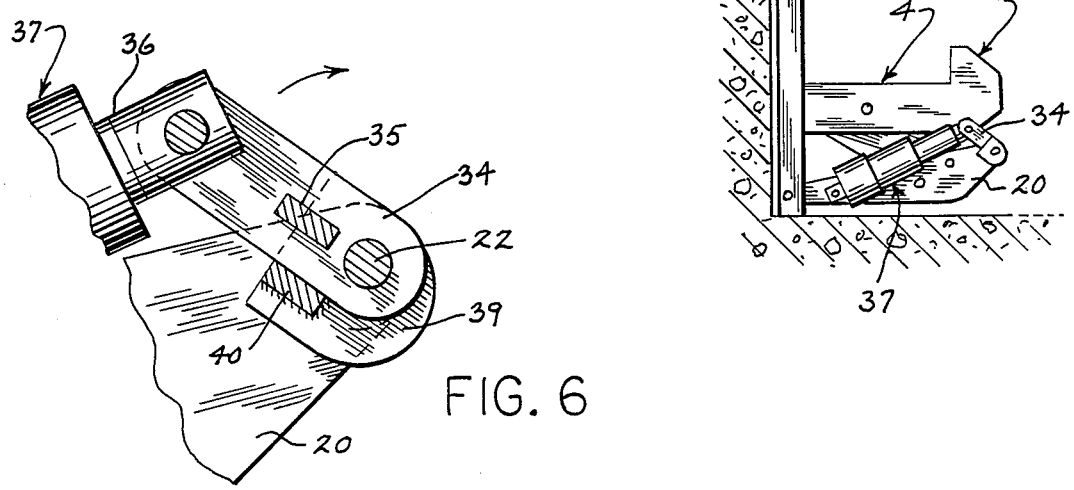
FIG. 6 is an enlarged fragmentary side elevation of the connection of the linear actuator to the linkage with the vehicle restraint in the lower position.

In operation, the vehicle restraint is normally retained in the lower or storage position, and in this position the shaft 36 of linear actuator 37 is retracted causing the side edges of links 34 to engage bar 40, as shown in FIG. 6. As bar 40 and lugs 39 are secured to shaft 22, this engagement will prevent link 23 from being pivoted relative to links 20 through the biasing action of gas spring units 27, and thus holds hook 16 in the lower position.

After the truck backs toward the loading dock and engages bumpers, not shown, mounted on dock face 2, an operator actuates the motor of linear actuator 37 to extend the shaft or rod 36. Extension of shaft 36 will enable the gas spring units 27 to move the hook assembly 4 upwardly in guides 10 and simultaneously pivot the tip 19 of the hook 16 upwardly above the level of the pivot shaft 17 and guide tracks 10. Hook 16 will be moved upwardly until the inner section engages ICC bar 5 as shown in FIG. 3. With the hook engaged with the ICC bar the truck will be prevented from accidentally moving away from the loading dock during the loading operation. Hook 16 will normally engage ICC bar 5 before actuator shaft 36 is fully extended, and the actuator rod will continue to extend, pivoting link 34 out of engagement with stop 40 on link 39, as shown in FIG. 7.

The biasing action of the gas spring unit 27 enables the hook 16, when engaged, to move up and down with vertical float of the truck bed. As hook 16 floats up and down, link 39 will pivot relative to link 34, which is connected to actuator shaft 36. Thus, the vehicle restraint will be retained in locking engagement with the ICC bar regardless of any floating action of the truck bed.

After the loading operation is completed, the hook 16 is moved to its storage position by operation of actuator 37 which will retract shaft 36 and initially pivot links 34 about shaft 22. Pivoting movement of links 34 will bring the side edges of links 34 into engagement with stop 40 and further retraction of shaft 36 will then cause rotation of link 39 and shaft 22 and corresponding pivotal movement of link 23 relative to links 20 to decrease the angle therebetween, thereby moving the hook 16 to the storage position as shown in FIG. 2. As the linear actuator 37 is self locking it will hold the hook 16 in the storage position against the force of the gas spring units 27 without the necessity of any auxiliary locking mechanism.

As previously noted, it is contemplated that other mechanisms such as a fluid cylinder could be employed in place of the linear actuator. However, as noted above the linear actuator has the advantage that it is self locking and will retain the hook in the storage position without any additional locking mechanism.

Through use of the linkage, the hook not only moves in a linear path, but will also pivot upwardly about shaft 17. This enables the hook 16 to be moved to a location substantially above the bottom 9 of pit 7. Thus the invention provides a greater range of movement for the hook than the length of the guide track 10 so that the guide track does not project upwardly above the bottom 9 of pit 7.

As the shaft 36 of linear actuator 37 will move to its fully extended position regardless of the location of engagement of the hook with the ICC bar, the possibility of undue stress on the linear actuator is eliminated.

As illustrated, the hook is biased to the upper or operative position by gas springs 27. However, other biasing mechanisms can be used in place of the gas springs 27.

Various modes of carrying out the invention are contemplated as being within the scope of the following claims particulary pointing out and distinctly claiming the subject matter which is regarded as the invention.

I claim:

1. A vehicle restraint for preventing accidental movement of a vehicle away from a fixed structure, comprising a frame mounted on the structure and including vertical *guide means, vehicle restraining means mounted for vertical movement on said guide means from a lower storage position to an upper operative position where said restraining means is adapted to engage an abutment on said vehicle to prevent movement of said vehicle in a direction away from said structure, biasing means operably connected to said restraining mens for biasing said restraining means to said upper operative position, and power operated drive means for moving said restraining means from the upper operative position to the lower storage position, said drive means being constructed and arranged so that the force of said drive means will overcome the force of said biasing means, a linkage including a first link having one end pivotally connected to said frame means and a second link having one end pivotally connected to said restraining means, the opposite ends of said first and second links being connected together at a pivot shaft, said links being disposed at an acute angle with respect to each other when said restraining means is in said lower storage position, said biasing means being operably connected to said linkage and constructed and arranged to pivot said links and enlarge said angle to thereby move said restraining means to the upper operative position, and said drive means being operably connected to said linkage and constructed and arranged to pivot said links and decrease said angle to thereby move said restraining means to the lower storage position.

2. The vehicle restraint of claim 1, wherein said biasing means comprises a gas spring.

3. The vehicle restraint of claim 1, and including a third link interconnecting said restraining means and said first link, said biasing means interconnecting said third link and said first link.

4. The vehicle restraint of claim 1, wherein said drive means comprises a linear actuator incorporating a recirculating ball screw.

5. The vehicle restraint of claim 1, wherein one of said links is fixed to said pivot shaft and said drive means is connected to said pivot shaft and operates to rotate said pivot shaft.

6. A vehicle restraint for preventing accidental movement of a truck away from a loading dock, comprising guide means mounted on a front face of said dock, a hook assembly including a slide mounted for vertical movement on said guide means and a hook pivotably connected to said slide about a pivot axis, said hook assembly being movable from a lower storage position to an upper operative position where said hook is adapted to engage an abutment on said vehicle, a first link having one end connected to said guide means, a second link having one end pivotably connected to said hook, the opposite ends of said first and second links being connected to a pivot shaft, said links being disposed at an acute angle to each other when said hook assembly is in the storage position, biasing means operably connected to said links for increasing the angle between said links and moving said slide upwardly on said guide means and pivoting said hook about said pivot axis to engage said abutment, and drive means operably connected to said links for decreasing said angle and moving said hook assembly to said lower storage position, the force of said drive means being sufficient to overcome said biasing means and retain said hook assembly in the storage position.

7. The vehicle restraint of claim 6, wherein said second link is fixed to said pivot shaft and said drive means is constructed and arranged to rotate said pivot shaft.

8. The vehicle restraint of claim 7, wherein said drive means comprises a reciprocating drive member, and connecting means connecting said drive member to said pivot shaft.

9. The vehicle restraint of claim 8, wherein said reciprocating drive member is arranged to engage and rotate said pivot shaft when moved in one direction and is arranged to be operably disengaged from said shaft when operated in the opposite direction to enable said biasing means to bias the hook assembly to the operative position.

10. The vehicle restraint of claim 8, wherein said connecting means includes a link having one end pivotably connected to said drive member and the other end fixed to said pivot shaft.

11. A vehicle restraint for preventing accidental movement of a vehicle away from a fixed structure, comprising a frame mounted on the structure and including guide means, restraining means having a guide member mounted for linear vertical movement on said guide means from a lower storage position to an upper position and having a restraining member mounted for pivotal movement relative to said guide member, first means for exerting a force to move said guide member upwardly from the lower storage position to the upper position and to simultaneously pivot said restraining member upwardly with respect to said guide member to effect engagement of said restraining member with an abutment on said vehicle, and second means for exerting a second force of greater magnitude than said first force to move said guide member downwardly with respect to said guide means and to simultaneously pivot said restraining member downwardly with respect to said guide member to effect disengagement of said restraining member with said abutment.

12. The vehicle restraint of claim 11, wherein said first means comprises resilient biasing means and said second means comprises power operated means.

13. A vehicle restraint for preventing accidental movement of a truck away from a loading dock, comprising guide means mounted on a front face of the dock, a hook assembly including a slide mounted for vertical movement on said guide means and a hook pivotably connected to said slide, said hook assembly being movable from a lower storage position to an upper operative position where said hook is adapted to engage an abutment on said vehicle, a first link having one end pivotably connected to said guide means at a first pivot, a second link having one end pivotably connected to said hook at a second pivot, the opposite ends of said first and second links being connected at a third pivot and being disposed at an acute angle to each other when said hook assembly is in the storage position, and means for increasing the magnitude of the angle between said links to thereby move said slide upwardly in said guide means and simultaneously pivot said hook relative to said slide to bring said hook into engagement with an abutment on said truck.

14. The vehicle restraint of claim 13 and including means for decreasing said angle to thereby move said slide downwardly in said guide means and pivot said hook downwardly relative to said slide.

15. The vehicle restraint of claim 14 and including a third link pivotably connected to the hook at a fourth pivot located inwardly towards said front face from said second pivot and the opposite end of said third link being connected to said first link at a fifth pivot located between said first and third pivots.

16. In combination, a loading dock having an upper surface and a generally vertical front face, and a vehicle restraint mounted on said front face, said vehicle restraint comprising a guide frame mounted on said front face, a hook assembly mounted for sliding movement on said guide frame and including a carriage movable on said guide frame and a hook pivotally connected to said carriage about a pivot axis, said hook assembly being movable from a lower storage position to an upper operative position where said hook is adapted to engage an abutment on a vehicle parked in front of said loading dock, said hook including a generally straight section pivotally connected to said carriage and an outer tip extending upwardly from the outer end of said straight section, a linkage interconnecting said hook assembly and said guide frame, biasing means for biasing the hook assembly to said operative position, and drive means operably connected to said linkage to move the hook assembly downwardly from the operative position to the storage position, said linkage being constructed and arranged so that the force of the biasing means will move said carriage upwardly relative to said guide frame and simultaneously pivot said hook upwardly relative to said carriage to enable the outer end of said straight section of the hook to be at a higher elevation than said pivot axis.

17. A truck restraint for preventing accidental movement of a truck away from a loading dock, comprising a guide frame mounted on the dock, a hook assembly mounted for sliding movement on said guide frame and including a slide movable on said guide frame and a hook pivotally connected to said slide, said hook assembly being movable from a lower storage position to an upper operative position where said hook is adapted to engage an abutment on said truck, a first link pivotally connected to the guide frame at the first pivot, a second link pivotally connected to the hook at a second pivot, said first and second links being pivotally connected together at a third pivot, a third link pivotally connected to the hook assembly at a fourth pivot located inwardly toward said loading dock from said second pivot, said third link being pivotally connected to said first link at a fifth pivot located inwardly toward the loading dock from said third pivot, said hook and said first, second and third links being arranged in generally a parallelogram configuration, and first means for moving the slide upwardly relative to said guide frame and simultaneously pivoting said hook upwardly relative to said slide.

18. The truck restraint of claim 17, including second means for moving the slide downwardly relative to said guide frame and simultaneously pivoting said hook downwardly relative to said slide.

19. The truck restraint of claim 18, wherein said first means includes biasing means for exerting a biasing force on said linkage and said second means is power operated and is capable of overcoming said biasing force.

20. The truck restraint of claim 19 wherein said second means is self-locking.

* * * * *